United States Patent
Chen

(10) Patent No.: US 7,254,279 B2
(45) Date of Patent: Aug. 7, 2007

(54) METHOD FOR IMAGE STABILIZATION BY ADAPTIVE FILTERING

(75) Inventor: Mei Chen, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 837 days.

(21) Appl. No.: 10/687,681

(22) Filed: Oct. 17, 2003

(65) Prior Publication Data

US 2005/0213840 A1   Sep. 29, 2005

(51) Int. Cl.
   *G06K 9/40*   (2006.01)
(52) U.S. Cl. .................................................... 382/261
(58) Field of Classification Search ................ 348/155, 348/208.3, 208.4, 208.13, 208.99, 402.1, 348/404.1, 407.1, 412.1, 415.1, 416.1, 431.1, 348/451, 452, 628, 669, 700, E7.007, E7.013, 348/FOR. 118, 123, 129, 131, 132, 151, 348/185; 382/236, 261; 396/55, 153, 421, 396/492, FOR. 889
See application file for complete search history.

(56) References Cited

OTHER PUBLICATIONS

Amit Agrawal et al., Video Stabilization Using Linear Consistency Models, 23rd Army Science conference (Dec. 2002).*
Amit Agrawal et al., "Video Stabilization Using Linear Consistency Models", 23rd Army Science conference (Dec. 2002).

* cited by examiner

*Primary Examiner*—Matthew C. Bella
*Assistant Examiner*—G. F. Cunningham

(57) ABSTRACT

A method for removing undesired motion from a sequential plurality of related images utilizes adaptive filtering of image motion to determine image shifts. Differences between sequential image motions are taken with respect to a reference frame and a smoothing filter is applied to such differences of a sample of images adjacent a test image. Image shift values are calculated by subtracting the difference associated with a test frame from a filtered sample that includes the test frame. The image shift values are compared to an image shift parameter and sample sizes adjusted and image shift values calculated in accordance with the adjusted sample sizes so that image stability is obtained without boundary flicker.

18 Claims, 2 Drawing Sheets

METHOD FOR IMAGE STABILIZATION BY ADAPTIVE FILTERING

BACKGROUND

1. Field of the Invention

The present invention relates to image stabilization. More particularly, this invention pertains to a method for image sequence stabilization that includes systematic elimination of blank areas in frames in the presence of image location adjustments.

2. Description of the Prior Art

Videos, especially those taken by hand-held means, such as home videos taken by amateur videographers, often include "shaky" portions due to the presence of, for example, unintentional hand tremor or other platform instability.

Prior solutions to the problem of filtering unwanted motion from videos have involved the relocation of images, effectively smoothing the overall motion. Commonly, a particular, perhaps prominent, feature, is selected and its location (horizontal, vertical or both) tracked from frame-to-frame. Thereafter, a filtering-based algorithm is applied to generate frame-by-frame adjustments of the (horizontal, vertical, or both) location of each image that includes such selected feature within or with respect to its frame.

While reducing the effect of such factors as hand tremor and smoothing motion to present a more-professional appearance, such techniques are subject to the creation of often-distracting blank border areas that differ from frame-to-frame. This can result in annoying "boundary flicker", reflecting the fact that the undesired hand tremor has been effectively transported from the image feature to the frame's borders by the step of motion compensation resulting in image relocation within the frame pursuant to the selected algorithm.

SUMMARY OF THE INVENTION

The preceding and other shortcomings of the prior art are addressed by the present invention that provides, in a first aspect, a method for removing undesired motion from a sequential plurality of related images each of which includes a stationary component. Each image is fixed within a frame of uniform dimension.

A plurality of sequential inter-frame movements of the component is determined over the plurality of frames, each inter-frame movement being associated with one of the frames. A reference frame is chosen that has an associated inter-frame movement. The difference between each of said inter-frame movements and the inter-frame movement associated with the reference frame is measured.

An image shift parameter, a smoothing filter and a test frame are chosen. At least one additional frame is chosen adjacent the test frame, the frames defining a sample.

The smoothing filter is applied to the difference values of the sample to obtain a filtered difference value from which the difference associated with the test frame is subtracted to obtain an image shift value.

The image shift value is compared to the image shift parameter and the number of frames of the sample are adjusted in accordance with such comparison. The image shift value is re-calculated on the basis of the adjusted number of frames of the sample.

The position of the image is shifted with respect to the test frame by the image shift value.

The next frame of the sequence is then designated as the test frame.

In a second aspect, the invention provides a method for removing undesired motion from a sequential plurality of related images each of which includes a stationary component. Each image is fixed within a frame of uniform dimension.

A plurality of sequential inter-frame movements of the component is determined over the plurality of frames, each inter-frame movement being associated with one of the frames.

A reference frame is chosen that has an associated inter-frame movement. The difference between each of said inter-frame movements and the inter-frame movement associated with the reference frame is measured.

An image shift parameter, a smoothing filter and a test frame are chosen. At least one additional frame is chosen adjacent the test frame, the frames defining a sample.

The smoothing filter is applied to the difference value of the sample to obtain a filtered difference value from which the difference associated with the test frame is subtracted to obtain an image shift value. The position of the image is shifted with respect to the test frame by the image shift value.

The next frame of the sequence is then designated as the test frame. Test frames are continued to be designated from the sequence until each frame of the sequence has been designated and the image fixed thereon shifted in accordance with the above-described process. All of the frames of the sequence are then enlarged by a zoom factor related to the image shift parameter.

The foregoing and other features of this invention will become further apparent from the detailed description that follows. Such description is accompanied by a set of drawing figures. Numerals of the written description, corresponding to those of the drawing figures, point to the features of the invention with like numerals referring to like features throughout both the written description and the drawings.

DETAILED DESCRIPTION OF THE PREFERRED EMBODIMENT

Figure 1:
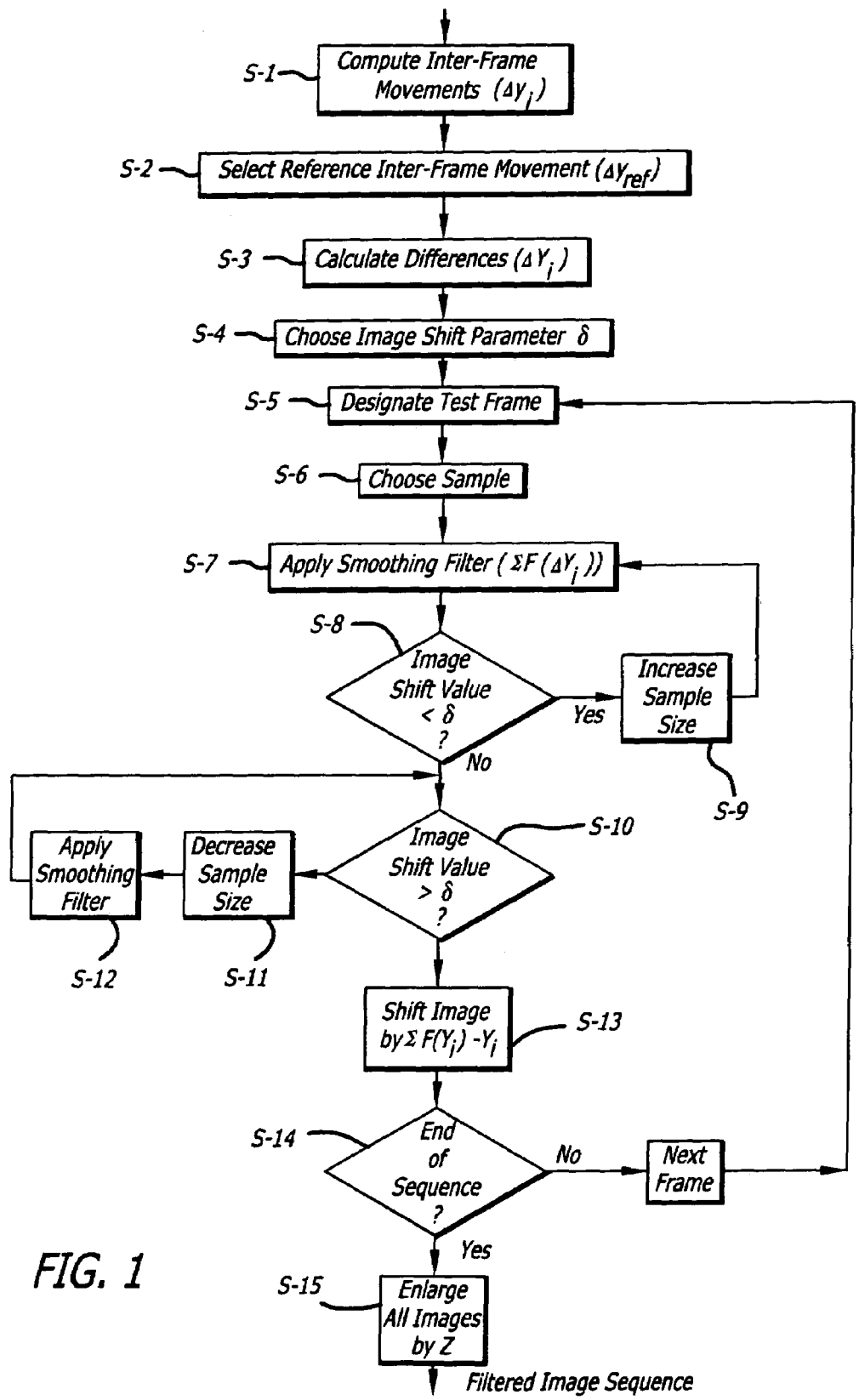
FIG. 1 is a flow chart of a method for image sequence stabilization in accordance with an embodiment of the invention.

FIG. 1 is a flow chart of a method for frame-to-frame image motion stabilization in accordance with an embodiment of the invention. The method employs an adaptive filtering technique to make adjustments to the positions of successive images with respect to frames of uniform dimension. Thereafter, a preselected enlargement or zoom factor is applied to all images, effectively filling the frames with the images to eliminate boundary flicker. As will be seen, by employing an adaptive filtering technique that is integrated with an image shift parameter (related to the zoom factor), the method of the invention attains the benefits of improved image sequence stability and absence of boundary flicker at an acceptable resolution level.

In discussing the method of the invention with reference to the flow chart of FIG. 1, it is assumed that the effects of undesired camera motion are limited to and measurable by the displacement of a stationary component of the image (e.g. a tree in the background) only with respect to the ordinate or "y" axis. Such an assumption is made for the sole purpose of facilitating and clarifying the discussion that follows. However, it will be appreciated that the discussion may be extended to include and correct for undesired image motion with respect to multiple axes (i.e. including "x" axis motion in an x-y reference system as well as undesired motions defined with respect to axes of other reference systems). The position of the stationary component in the i-th frame is designated $y_i$.

The method of the invention is begun at step S-1 by computing the sequential inter-frame movements $\Delta y_i$ ($=y_i-y_{i-1}$) of the stationary component of the image over the sequence of frames. Such values represent the sequential motion of the image sensor (e.g. camera) as opposed to actual motion of the component and will typically be measured in pixels of the digital or digitized images captured. Computation of the $\Delta y_i$ values may be accomplished by means of a number of algorithms that are capable of selecting a stationary image component and measuring a corresponding sequence of motions. See, for example, Hapreet S. Sawhney and Serge Ayer, "Compact Representations of Videos Through Dominant and Multiple Motion Estimation," IEEE Transactions on Pattern Analysis and Machine Intelligence, vol. 18, no. 8 (1996), pp. 814-830 and J. M. Odobez and P. Bouthemy, "Robust Multiresolution Estimation of Parametric Motion Models," Journal of Visual communication and Image Representation, vol. 6, no. 4 (December 1995), pp. 348-365. The measurement of $\Delta y_i$ may be based upon the assumption of simple translational motion or a more complex motion model, such as affine motion that takes rotation, scaling and shearing into account.

At step S-2, a single frame of the image sequence, with an associated inter-frame movement value $\Delta y_{ref}$, is selected and is designated, for purposes of the discussion that follows, as the "reference frame". Such a selection maybe made arbitrarily although the first frame of the sequence is generally selected for convenience.

A value of $\Delta y_i$ having been established for each frame, including the selected reference frame, at step S-1 and a reference frame designated at step S-2, another sequence of values $\Delta Y_i$ ($=\Delta y_i - \Delta y_{ref}$) is calculated at step S-3. Each value of $\Delta y_i$ is associated with a frame i, just as a value of $\Delta y_i$ is associated with each frame.

The $\Delta Y_i$ values provide indications of the degree to which the selected stationary component in any of the (i-1) remaining frames is displaced relative to an established reference. This, unlike a $\Delta y_i$ value, provides a basis for stabilizing the full sequence with respect to a common reference frame.

An image shift parameter $\delta$ is selected at step S-4. While $\delta$ is theoretically capable of being assigned any value, in practical application its choice is user or application dependent. As will be seen below, boundary flicker is removed, after image shifting for the purpose of motion stabilization, by enlarging the images to fill otherwise-blank border portions of associated frames. Such enlargement or zooming of an image reduces image resolution. Preferably, the value of $\delta$ will dictate Z represents an amount of image enlargement or zoom factor that results in, at most, a modest, and preferably imperceptible, reduction in resolution. An acceptable reduction of image resolution is a function of the video application and will vary in accordance with the video quality required, for example, by an audience.

Once a sequence of values of $\Delta Y_i$ has been derived and an image shift parameter $\delta$ chosen, an adaptive filtering process is employed to determine adjustments to the locations or positions of the individual images (y) of the image sequence with respect to their associated frames (i). The values of the adjustments represent the amounts (generally measured in pixels) that individual images are to be shifted to remove undesired motion from the image sequence.

The adaptive filtering process described below is designed to assure that the image shifts are determined on the basis of statistical samples (i.e., number of images) of maximum size. In this way, maximum sequence motion smoothness (stability) is obtained. Each sample comprises the test image plus at least one other image that is adjacent the test image. The adaptive filtering process described below yields sample sizes that are inversely related (although not in the strict sense) to the amount of motion (position shifting) of the stationary component in the test frame relative to that of the stationary component in adjacent frames. Thus, sudden or jerky motions are compensated in a relatively isolated manner with few adjacent frames comprising the filtered sample. In this way, the intended dramatic or large shift of the image with respect to the test frame is not masked by the inclusion of data covering more tranquil segments of the image sequence. On the other hand, the frame-to-frame smoothness of image shifting is enhanced when based upon large sample sizes during more tranquil segments of the image sequence.

The adaptive filtering process involves the computation of successive frame-by-frame image adjustments or shifts. Logically, although not exclusively, such method will proceed sequentially through all frames of the image sequence, with the first frame chosen as the reference frame.

Turning to the adaptive filtering process, a representative (i-th) test frame is selected for determination of an appropriate image shift at step S-5. At least one additional image of the image sequence adjacent the test image is chosen, the test image and the additional adjacent image(s) forming a sample, at step S-6. The images of the image sequence forming the sample may be arranged either symmetrically or asymmetrically with respect to the test frame. The type of sample chosen will depend upon the type of a smoothing filter F() to be applied. Examples of smoothing filters include, among others, Gaussian, Kalman and box filters. In contrast, non-smoothing filters include, but are not limited to, median and edge detector filters. In the case of a symmetric filter (e.g. a Gaussian filter), images are paired on either side of the test image creating samples comprising an odd number of images while appropriate samples for application to an asymmetric smoothing filter (e.g. a Kalman filter) may comprise either an even or odd number of images.

The selected smoothing filter is applied to the $\Delta Y_i$ values of the images of the selected sample at step S-7. The $\Delta Y_i$ value of the test image is then subtracted from the filtered value of the sample, $\Sigma F(\Delta Y_i)$. The resultant difference comprises an image shift value that is then compared to the image shift parameter $\delta$. In the event such difference is determined to be less than $\delta$ at step S-8, the size of the sample is increased at step S-9 in either a symmetrical or asymmetrical manner in accordance with the type of filter F() employed and the new, larger sample, examined by again cycling through steps S-7 and S-8.

Once it is determined that the sample is of sufficient size or width to yield an image shift value ($\Sigma F(\Delta Y_i) - \Delta y_i$) that is not less than the image shift parameter $\delta$, such difference is examined at step S-10 to determine whether, in perhaps widening the sample size, the difference now exceeds $\delta$. Obviously, only for the rare case of a sample size that yields an image shift value that is exactly equal to the image shift parameter δ will the response to the inquiry at step S-10 (which follows the inquiry at step S-8) be negative. Rather, in most cases, the size of the sample will be decreased in either a symmetrical or asymmetrical manner at step S-11. Thus, although a sample of maximum size is desired (steps S-8, S-9) to obtain maximum smoothness, this is tempered (steps S-10, S-11) by the necessity of assuring that,the image shift parameter δ is not exceeded which, as will be seen below, will assure that border flicker is removed upon application of a zoom factor to all frames of the image sequence that is related to the value of the parameter δ (relationship discussed below). The new sample is applied to the filter at step S-12 and again examined at step S-10.

Once the sample size has been determined not to be excessive by means of the adaptive filtering process described above, the image is shifted by the resultant image shift value ($\Sigma F(\Delta Y_i) - Y_i$) at step S-13. This shift represents a correction of the position of the image of the test frame for the amount (number of pixels) that the stationary component in the test frame is out of alignment with the filtered position of such component based upon the maximum number of surrounding (adjacent) images.

Once an indication is obtained at step S-14 that all images of the sequence have been shifted by amounts determined as above, all images are enlarged by a zoom factor related to the image shift parameter δ, increasing their dimensions to exceed those of their frames at step S-15. The enlargement of an image offsets the blank space created adjacent a boundary between an edge of the image and that of its frame by shifting of the image with respect to the frame. The amount of enlargement, commonly designated as zoom factor Z, is related to the image shift parameter δ for a frame of dimension f (in the example employed to illustrate the method of the invention, the dimension f is measured along the y axis) by the following relationship:

$$Z = (1 + 2\delta/f) \quad \text{(Equation 1)}$$

As each frame is of fixed, uniform size, this effectively "fills" each of the frames to eliminate boundary flicker from the image sequence.

Figure 2A:
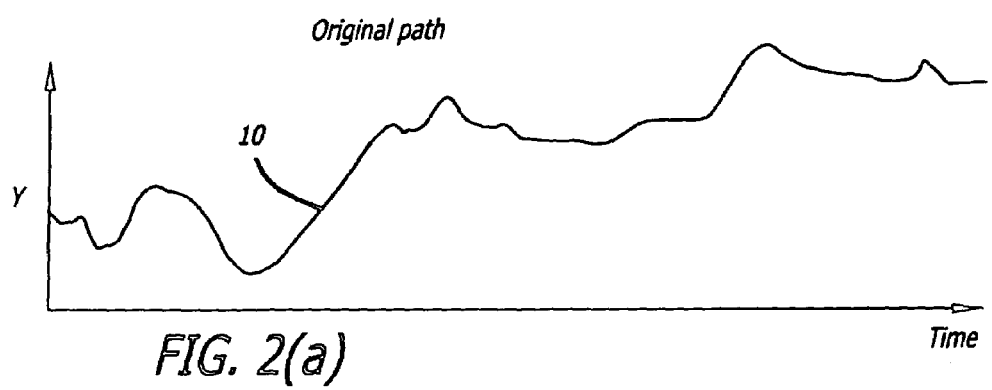
FIGS. 2(a) through 2(c) is a series of graphs that illustrate the process of image stabilization in accordance with an embodiment of the invention.
Figure 2B:
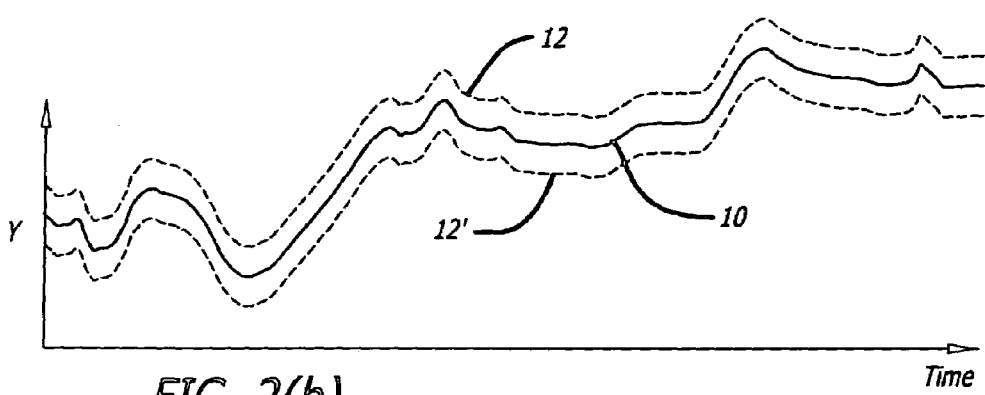
Figure 2C:
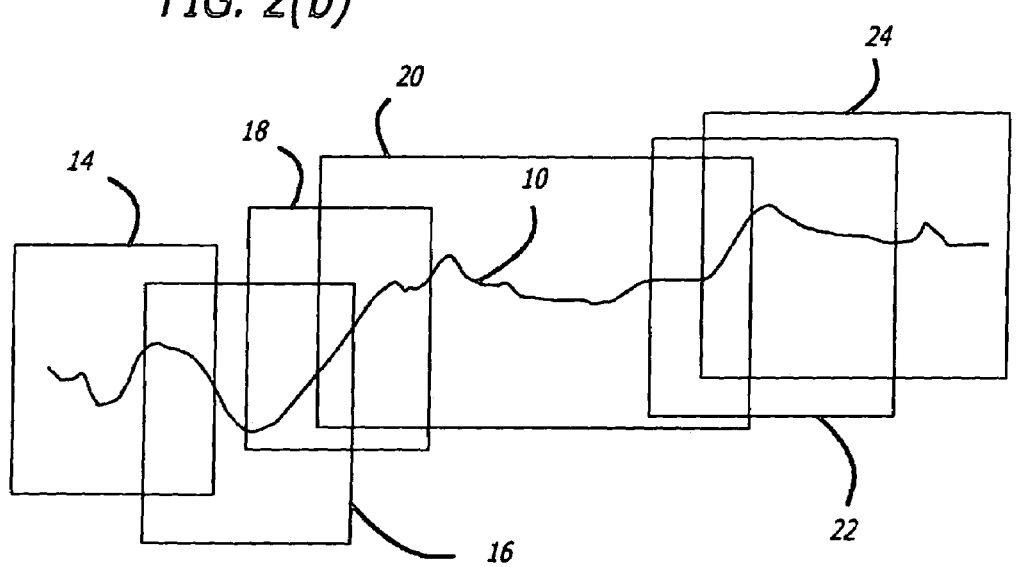

FIGS. 2(*a*) through 2(*c*) are a series of graphs that illustrate the above-described process of image sequence stabilization in accordance with an embodiment of the invention. In FIG. 2(*a*) the path of a stationary component in a sequence of images is plotted along a path 10. FIG. 2(*b*) illustrates the bounds, indicated by the lines 12 and 12', corresponding to the image shift parameter δ that defines the amount of permissible shifting of individual images of the image sequence.

FIG. 2(*c*) illustrates the general relationship between the degree of image sequence stability and the size or width of the image samples 14 through 24 determined in accordance with the adaptive filtering process employed in accordance with an embodiment of the invention. As can be seen, the size (number of adjacent images) of a sample is inversely related to the localized degree of frame-to-frame motion. Thus, the samples 16 and 18 are relatively small or narrow while encompassing regions of relatively large frame-to-frame motion along the path 10 while the sample 20 is relatively wide, covering a relatively steady region of the path 10.

Thus it is seen that the present invention provides a method for removing undesired motion from a sequential plurality of related images. By employing the teachings of the invention, one may substantially eliminate the type of undesired motion that is commonly introduced into videos taken by means of hand-held cameras and other unstable platforms.

The invention offers a highly reliable means of image sequence stabilization based upon an adaptive filtering technique in which sample size is varied in accordance with the degree of localized frame-to-frame image motion. By employing a predetermined factor in conjunction with the adaptive filtering process that may later be employed to enlarge images shifted in accordance with the adaptive filtering process, one may eliminate the problem of boundary flicker without undue loss of resolution.

While the invention has been disclosed with reference to its presently-preferred embodiment, it is not limited thereto. Rather, the invention is limited only insofar as it is defined by the following set of patent claims and includes within its scope all equivalents thereof.

What is claimed is:

1. A method for removing undesired motion from a sequential plurality of related images, each of such images including a stationary component and being fixed within a frame of uniform dimension, said method comprising the steps of:

determining a plurality of sequential inter-frame movements of said stationary component over a plurality of frames, each of said inter-frame movements being associated with one of said plurality of frames;

choosing a reference frame, said reference frame having an associated inter-frame movement;

measuring the difference between each of said inter-frame movements and the inter-frame movement associated with said reference frame;

choosing an image shift parameter;

choosing a smoothing filter;

designating a test frame;

selecting at least one additional frame adjacent said test frame, said at least one additional frame and said test frame defining a sample;

applying said smoothing filter to the difference values of said sample to obtain a filtered difference value;

subtracting the difference associated with said test frame from said filtered value to obtain an image shift value;

comparing said image shift value to said image shift parameter;

adjusting the number of frames of said sample in accordance with said comparison;

calculating said image shift value on the basis of said adjusted number of frames of said sample;

shifting the position of the image associated with said test frame and image shift value with respect to said test frame by said image shift value;

designating the next frame of said sequence as said test frame.

2. A method as defined in claim 1 further including the step of enlarging all of said frames of said sequence by a zoom factor related to said image shift parameter.

3. A method as defined in claim 2 wherein the step of adjusting the number of frames of said sample in accordance with said calculated image shift value includes the steps of:

increasing the number of frames of said sample when said calculated image shift value is less than said image shift parameter; then calculating an adjusted image shift value in accordance with said increased number of frames;

continuing to increase said number of frames of said sample until said image shift value is no longer less than said image shift parameter;

decreasing the number of frames of said sample when said image shift value exceeds said image shift parameter.

4. A method as defined in claim 1 wherein the step of choosing a reference frame further includes the step of selecting the first frame of said sequential plurality of related images as said reference frame.

5. A method as defined in claim 1 wherein the step of selecting at least one additional frame further includes the step of selecting unequal numbers of frames prior to and after said test frame in said sequential plurality of related images.

6. A method as defined in claim 1 wherein the step of selecting at least one additional frame further includes the step of selecting equal numbers of frames prior to and after said test frame in said sequential plurality of related images.

7. A method as defined in claim 1 wherein the step of selecting a smoothing filter includes the step of selecting a Gaussian filter.

8. A method as defined in claim 1 wherein the step of selecting a smoothing filter includes the step of selecting a Kalman filter.

9. A method as defined in claim 1 wherein the step of selecting a smoothing filter includes the step of selecting a box filter.

10. A method for removing undesired motion from a sequential plurality of related images, each of such images including a stationary component and being fixed within a frame of uniform dimension, said method comprising the steps of:
   determining a plurality of sequential inter-frame movements of said stationary component over said plurality of frames, each of said inter-frame movements being associated with one of said plurality of frames;
   choosing a reference frame, said reference frame having an associated inter-frame movement;
   measuring the difference between each of said inter-frame movements and the inter-frame movement associated with said reference frame;
   choosing an image shift parameter;
   choosing a smoothing filter;
   designating a test frame;
   selecting at least one additional frame adjacent said test frame, said at least one additional frame and said tesframe defining a sample;
   applying said smoothing filter to difference values of said sample to obtain a filtered difference value;
   subtracting the difference associated with said test frame from said filtered difference value to obtain an image shift value;
   shifting the position of the image associated test frame and image shift value with respect to said test frame by said image shift value;
   designating the next-frame of said sequence as said test frame;
   continuing to designate test frames from said sequence until each frame of said sequence has been designated and the image fixed thereon shifted in accordance with said above-described process; and then
   enlarging all of said frames of said sequence by a zoom factor related to said image shift parameter.

11. A method as defined in claim 10 further including the steps of:
   comparing said image shift value to said image shift parameter;
   adjusting the number of frames of said sample in accordance with said comparison;
   calculating said image shift value on the basis of said adjusted number of frames of said sample.

12. A method as defined in claim 11 wherein the step of adjusting the number of frames of said sample in accordance with said calculated image shift value includes the steps of:
   increasing the number of frames of said sample when said calculated image shift value is less than said image shift parameter; then
   calculating an adjusted image shift value in accordance with said-increased number of frames;
   continuing to increase said number of frames of said sample until said image shift value is no longer less than said image shift parameter;
   decreasing the number of frames of said sample when said image shift value exceeds said image shift parameter.

13. A method as defined in claim 10 wherein the step of choosing a reference frame further includes the step of selecting the first frame of said sequential plurality of related images as said reference frame.

14. A method as defined in claim 10 wherein the step of selecting at least one additional frame further includes the step of selecting unequal numbers of frames prior to and after said test frame in said sequential plurality of related images.

15. A method as defined in claim 10 wherein the step of selecting at least one additional frame further includes the step of selecting equal numbers of frames prior to and after said test frame in said sequential plurality of related images.

16. A method as defined in claim 10 wherein the step of selecting a smoothing filter includes the step of selecting a Gaussian filter.

17. A method as defined in claim 10 wherein the step of selecting a smoothing filter includes the step of selecting a Kalman filter.

18. A method as defined in claim 10 wherein the step of selecting a smoothing filter includes the step of selecting a box filter.

* * * * *

UNITED STATES PATENT AND TRADEMARK OFFICE
CERTIFICATE OF CORRECTION

PATENT NO. : 7,254,279 B2 Page 1 of 1
APPLICATION NO. : 10/687681
DATED : August 7, 2007
INVENTOR(S) : Mei Chen It is certified that error appears in the above-identified patent and that said Letters Patent is hereby corrected as shown below:

On the face page, in field (56), under "Other Publications", in column 2, lines 3-4, delete "Amit Agrawal et al., "Video Stabilization Using Linear Consistency Models", 23rd Army Science conference (Dec. 2002).".

In column 7, line 31, in Claim 10, after "over" delete "said" and insert -- a --, therefor.

In column 7, line 44, in Claim 10, delete "tesframe" and insert -- test frame --, therefor.

In column 7, line 50, in Claim 10, after "associated" insert -- with said --.

In column 7, line 53, in Claim 10, delete "next-frame" and insert -- next frame --, therefor.

In column 8, line 23, in Claim 12, delete "said-increased" and insert -- said increased --, therefor.

Signed and Sealed this

Twenty-second Day of July, 2008

JON W. DUDAS
*Director of the United States Patent and Trademark Office*